United States Patent [19]

Kappert

[11] 4,057,832
[45] Nov. 8, 1977

[54] APPARATUS FOR READING A DISK-SHAPED RECORD CARRIER WITH TRACK JUMPING FOR CHARGING MOTION EFFECTS

[75] Inventor: Hermanus Antonius Kappert, Eindhoven, Netherlands

[73] Assignee: U.S. Philips Corporation, New York, N.Y.

[21] Appl. No.: 628,594

[22] Filed: Nov. 4, 1975

[30] Foreign Application Priority Data

Aug. 21, 1975 Netherlands .................. 7509906

[51] Int. Cl.² .............................................. H04N 5/76
[52] U.S. Cl. ............................. 358/128; 179/100.3 V; 360/10
[58] Field of Search ................ 178/6.6 OD, 6.6 FS, 178/6.6 R, 6.7 R, 6.7 A; 179/100.3 V, 100.3 B, 100.3 D, 100.41 L, 100.4 R, 100.4 M; 360/10, 77; 340/173 LT, 173 LM; 358/128

[56] References Cited

U.S. PATENT DOCUMENTS

| 3,854,015 | 12/1974 | Janssen | 179/100.3 V |
| 3,876,842 | 4/1975 | Bouwhuis | 179/100.3 V |
| 3,911,211 | 10/1975 | Rennick | 179/100.3 V |

Primary Examiner—Raymond F. Cardillo, Jr.
Attorney, Agent, or Firm—Frank R. Trifari; Simon L. Cohen

[57] ABSTRACT

An apparatus for optically reading a record carrier on which information is contained in tangentially extending tracks includes a directing system for making the scanning spot cooperate with the desired track. In order to enable a jump-wise displacement of the scanning spot from a track being followed to an adjacent track, a switching device is provided for supplying a suitable control signal to the directing system. The control signal is automatically adapted to varying track distances, so that a correct jump-wise displacement of the scanning spot is guaranteed.

8 Claims, 9 Drawing Figures

APPARATUS FOR READING A DISK-SHAPED RECORD CARRIER WITH TRACK JUMPING FOR CHARGING MOTION EFFECTS

The invention relates to an apparatus for reading a disk-shaped record carrier on which information is recorded in optically coded form in tangentially extending tracks. The apparatus comprises a radiation source for producing a read beam of radiation, a directing system for making a scanning spot caused by said read beam of radiation on the record carrier co-operate with a desired track, a read detector for converting the information contained in said read beam of radiation after cooperation with the record carrier into an electrical signal, a measuring detector for measuring the radial position of the scanning spot relative to the desired track and for supplying a corresponding control signal to the directing system, and a switching device for causing the scanning spot to effect a jump-wise displacement from a track being followed to an adjacent track upon a start signal which is supplied by a command device. The switching device comprises a signal source for supplying a control signal suitable for causing said jump-like displacement to the directing system. The control signal consists of two consecutive signal periods of mutually substantially the same duration and substantially the same shape, but of opposite polarity.

Disk-shaped record carriers of the type mentioned in the preamble are for example suitable as a recording medium for a television signal. Said television signal is then generally recorded in a spiral track, which during normal reading is scanned continuously. These record carriers, however, may also be employed for storing other types of information, such as for example audio information only, a very long playing time being attainable with the aid of, for example, time or frequency multiplet techniques. Alternatively, such a record carrier may be used to advantage as a storage medium for personal data, x-ray images and other archival-type information. For these last-mentioned applications the record carrier will generally be provided with concentric tracks instead of a spiral track.

The use of an optical coding and an associated optical read system has the major advantage that the scanning spots can be moved freely on the record carrier, without giving rise to damage to this record carrier. This opens up important additional possibilities for the use of this type of record carrier. During read-out of a television signal which is recorded on such a record carrier, this for example enables the reproducing speed for the recorded information to be varied at will. In the case of a record carrier on which said television signal is recorded in a spiral track, it is for example possible to realize a still picture during reproduction by moving the scanning spot radially backwards over one track distance in a jump-wise fashion after every revolution of the record carrier, so that during the desired time always one and the same track circumference is scanned. In order to realize a so-called "slow motion" at for example half the normal speed of movement the scanning spot can be moved radially backwards over one track distance after every two revolutions of the record carrier. If the record carrier has a number of concentric tracks instead of one spiral track, it is necessary for the read apparatus to incorporate provisions which enable the scanning spot to be moved from track to track in a radial direction.

A read apparatus of the type mentioned in the preamble, including such a provision is described in U.S. Pat. No. 3,854,015. The directing system incorporated in the read apparatus according to said patent comprises a beam-deflection means disposed in the read beam of radiation, in general a mirror, which by a rotation can produce a displacement of the scanning spot in a radial direction, i.e. perpendicular to the track direction. Said beam-deflection means forms part of a control system which further includes the measuring detector, said control system ensuring that the scanning spot always remains correctly positioned on the desired track despite changes of the radial position of the tracks.

In order to enable said jump-wise displacement of the scanning spot from a track which is being followed to an adjacent track, said known apparatus includes a switching device, which after a start signal supplied by a command device on the one hand interrupts the control loop formed by the control system, and on the other hand supplies a control signal suitable for causing the jump-wise displacement of the scanning spot to the beam-deflection means. For this purpose this control signal consists of two consecutive signal periods of mutually substantially the same duration and substantially the same predetermined amplitude variation, but of opposite polarity. It is obvious that the duration and the amplitude variation of said control signal have been selected so that this control signal causes a displacement of the scanning spot over the nominal track distance.

For a correct reproduction of the recorded information after such a jump-wise displacement of the scanning spot has been performed, it is of course of particular importance that after said displacement the scanning spot most accurately coincides with the new desired track. However, it has been found that in this respect a number of factors play a part which cannot be controlled entirely. For example, the track distance between two adjacent tracks is subject to tolerances which occur during manufacture of the record carrier, so that said track distance varies both as a function of the radial position on the record and from record to record. If the actual track distance deviates from the nominal value, it is evident that after the known apparatus has effected the jump-wise displacement of the scanning spot there will be a residual positional error relative to the new desired track, so that it may even happen that the scanning spot is pulled on this track by the control system.

Furthermore, the effect of the control signal depends on the initial values, i.e. the positional error of the scanning spot relative to the track being followed at the beginning of this control signal and the radial speed of this scanning spot which then obtains. Depending on these initial values both final positional errors and final speed errors may arise upon termination of the control signal, so that pulling in on the desired track is impaired.

Moreover, final positional errors may occur if the natural resonant frequency of the beam-deflection means deviates from the frequency which corresponds to the speed of the record carrier, which final error is then caused by the movement of the beam-deflection means itself during the control signal.

It is an object of the invention to provide an apparatus of the type mentioned in the preamble, in which provisions have been made to mitigate the above-mentioned problems and to ensure a correct jump-wise displacement of the scanning spot. For this, the invention is characterized in that the switching device includes a detection circuit for detecting the instant at which the scanning spot is located half-way between the two adjacent tracks during the jump-wise displacement and for at that instant supplying a detection signal to the signal source, and that said signal source is adapted to supply a control signal whose two signal periods have a duration which automatically substantially equals the time between the start signal and the detection signal.

The step according to the invention ensures in a simple manner that the control signal is automatically adapted to the varying track distance and the initial values. This has the major advantage that the requirements with respect to the tolerances of the quantities which are of interest for the jump-wise displacement, such as the track distance, the resonant frequency of the beam-deflection means etc. can be reduced considerably. Further details of the apparatus according to the invention will be described with with reference to the drawing, in which FIG. 1 shows the known apparatus, FIG. 2, consisting of a and b, shows a method used therein for generating a suitable signal for measuring the radial position of the scanning spot and FIG. 3, consisting of a through d, shows a number of signals which appear in the known apparatus during said jump-wise displacement of the scanning spot.

Figure 1:
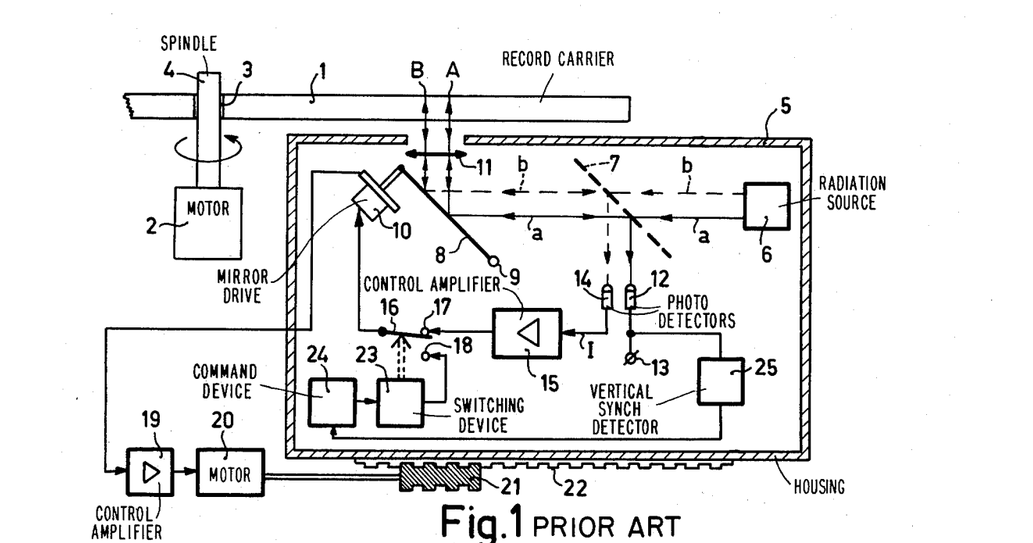

FIG. 1 shows a disk-shaped record carrier 1, which is rotated by a motor 2 via a spindle 4 which extends through a central opening 3 of this record carrier 1. This record carrier 1 comprises either a spiral track, or a multitude of concentric tracks, on which the information is recorded in optically coded form. The specific embodiment of this record carrier, i.e. a rigid disk or foil, the method of optical coding, for example embossed pattern or black-white pattern and the method of signal coding are of secondary interest for the present invention, so that this will not be discussed in more detail. For illustration reference is made to U.S. application Ser. Nos. 618,215, filed Sept. 30, 1975; 344,867, filed Mar. 26, 1973 and 442,396, filed Feb. 14, 1974 and U.S. Pat. Nos. 3,855,426; 3,963,862; and 3,962,720, in which some embodiments of record carriers and the method of optical coding are described.

The information recorded on the record carrier 1 is read with the aid of an optical read system, which is accommodated in a housing 5. This read system first of all comprises a radiation source 6, which emits a radiation beam $a$. Said radiation beam $a$ is deflected via a semi-transparent mirror 7 and a mirror 8 to the record carrier 1 and with the aid of a lens 11 it is focussed on the surface of said record carrier on which the information is recorded. In the present instance this is the reflecting upper surface, the medium of the record carrier of course being light-transmitting. The radiation beam, which has been modulated by the information of said record carrier, is reflected by the upper surface of the record carrier 1 and via the lens 11, the mirror 8 and the semi-transparent mirror 7 it is reflected to a read detector 12. As a result, the point of incidence of the beam of radiation of the record carrier, to be called scanning spot hereinafter, is imaged on this read detector 12. This read detector 12 converts the applied optical information into an electric signal, which is subsequently available at an output terminal 13 for further processing, such as decoding.

In order to enable the information recorded on the record carrier 1 to be read, the optical read system should include a control device, which ensures that the scanning spot A always coincides with the information track. This control device, which consequently controls the radial position of the scanning spot A, should first of all be capable of following the variations of the radial position of the tracks, for example owing to an eccentricity of the "central" opening 4. If the record carrier 1 has a spiral track, this scanning spot A should also be moved in a radial direction over a distance which corresponds to the pitch of this track during every revolution of the record carrier.

This necessary control of the radial position of the scanning spot is achieved with the aid of a directing system, which comprises the mirror 8. This mirror 8 is rotatable and can be rotated around a spindle 9 with the aid of a drive means 10, so that the deflection of the radiation beam $a$ and thus the radial position of the scanning spot A can be modified. The control signal required for this drive means is supplied by a control amplifier 15, which receives a measuring signal I from a measuring detector 14. This measuring detector 14 cooperates with a radiation beam $b$, which is emitted by the radiation source 6 parallel to the radiation beam $a$ and which after cooperation with the record carrier 1 is incident on this measuring detector 14. This combination of a radiation beam $b$ and measuring detector 14 should then of course supply a measuring signal I which is representative of the position of the scanning spot A relative to the desired track.

From the literature various systems are known which supply such a measuring signal. For example, in U.S. Pat. Nos. 3,833,769 and 3,876,842 two systems are described in which a suitable measuring signal is obtained by a suitable combination of the shape of the radiation beam 6, i.e. the pattern of radiation spots produced on the record carrier by this beam, and the embodiment of the measuring detector 14. From U.S. Pat. No. 3,381,086 and German patent application No. 2,342,906 two systems are known, in which the measuring signal is directly derived from the read beam of radiation $a$, so that in said systems no additional radiation beam $b$ need be used. From U.S. patent application Ser. No. 442,396, filed Feb. 14, 1974 a system is also known, in which no additional radiation beam $b$ is required, but where the measuring signal can be derived from the read beam of radiation in that the tracks on the record carrier are provided with a fixed periodic pattern of undulations in a radial direction. The measuring signals ultimately obtained with the aid of these cited systems, however, exhibit no basic differences and may therefore each be used as such in the apparatus according to the present invention.

Figure 2:
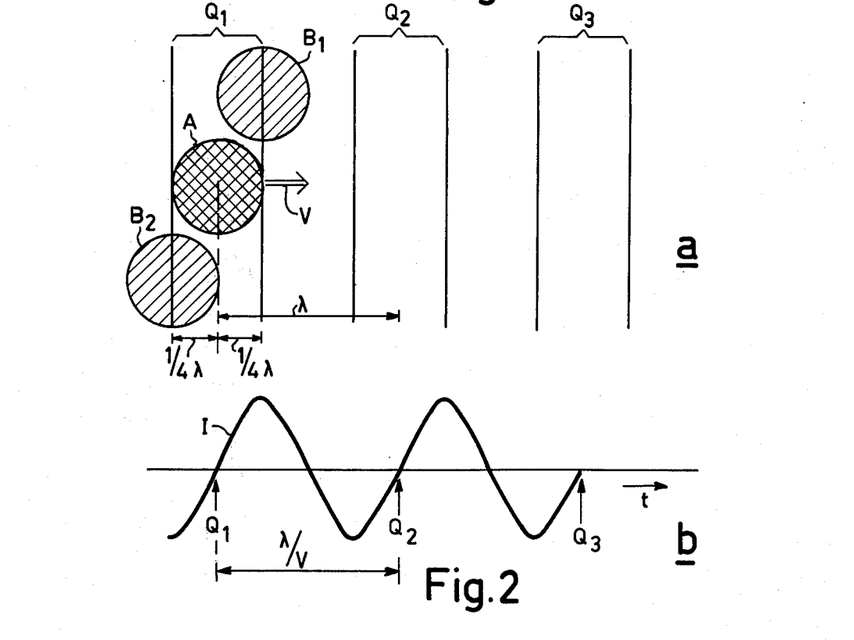

To illustrate the variation of this measuring signal I, FIG. 2 schematically represents the system as described in the cited U.S. Pat. No. 3,876,842. In this system the radiation beam $b$ consists of two sub-beams, so that two radiation spots $B_1$ and $B_2$ are projected on the record carrier. These two radiation spots $B_1$ and $B_2$ are located at either side of the scanning spot A as regards their radial positions, while their radial shift relative to this scanning spot is $\frac{1}{2}\lambda$, $\lambda$ being the nominal track spacing. FIG. 2a shows the positioning of these radiation spot $B_1$ and $B_2$ and the scanning spot A in the situation that the scanning spot A correctly impinges on a track $Q_1$. Moreover, two further tracks $Q_2$ and $Q_3$ are shown. These tracks $Q_1$, $Q_2$ and $Q_3$ may consequently be purely concentric tracks but they may also form part of a spiral track.

In order to obtain the desired measuring signal I the measuring detector 14 is divided into two halves, which each receive one of the two sub-beams corresponding to the radiation spots $B_1$ and $B_2$. The measuring signal I is then obtained by subtracting the output signals of these two detector halves. It is evident that in the situation shown in FIG. 2a, the reflection of the sub-beams at the location of the radiation spots $B_1$ and $B_2$ is equal, so that the ultimately obtained measuring signal I is zero. In order to give an impression of the variation of this measuring signal I in the case that the scanning spot A, and thus the radiation spots $B_1$ and $B_2$, are moved in a radial direction. FIG. 2b shows the variation of this measuring signal I under the condition that the scanning spot A is moved in a radial direction with a constant speed V. The periodically varying (substantially sinusoidal) measuring signal I shown is then obtained, the period being equal to $\lambda/V$. The instants denoted by $Q_1$, $Q_2$ and $Q_3$ then represent the instants at which the scanning spot just cooperates with the tracks $Q_1$, $Q_2$ and $Q_3$ respectively. It is evident from this variation of the measuring signal that around these zero passages which correspond to the tracks $Q_1$, $Q_2$, $Q_3$ a measuring range exists in which the value and polarity of this measuring signal is a direct measure of the radial positional deviation of the scanning spot A relative to the relevant track. Once this scanning spot A cooperates with a certain track, this situation will be maintained owing to this measuring signal and the beam-deflection means controlled by it.

As for practical reasons it is impracticable to have the scanning spot A cover the entire area of the record carrier in a radial direction with the aid of the mirror 8, the read apparatus of FIG. 1 comprises a second drive means, which for example consists of a worm 21 driven by a motor 20, which worm co-operates with a gear track 22 which is secured to the housing 5, so that the complete housing 5 with the optical read system can be moved in a radial direction. In the case that the record carrier has a spiral track the motor 20 may for example be operated with a constant speed.

In a more sophisticated embodiment this motor 20 receives the mirror control signal via the control amplifier 19, which signal is derived from the rotational position of the mirror 8, so that the maximum deflection of the mirror 8 relative to its rest position remains limited, irrespective of the desired radial movements of the scanning spot. Since the motor 20, worm 21 and attached apparatus cannot follow the rapid mirror control signal variations corresponding to eccentricity of the record, due to the relatively high mass of the motor and attached apparatus the effect on motor 20 of these variations will be cancelled due to the integrating affect of the motor mass. The only portion of the mirror control signals that will affect the motor 20 are those that represent a failure in the radial drive motor 20 to accurately follow the average spiral track independent of eccentricity. This is not due to any special provisions but is merely caused by the mass of the motor and attached apparatus.

As previously stated, the use of an optical coding of the record carrier and an optical read system has the advantage that without any problems the scanning spot may be moved over the record carrier without giving rise to any damage. This in particular enables this scanning spot to be moved jump-wise from a specific track which is being followed to an adjacent track, so that the previously described extra degree of freedom as regards the method of reproducing the recorded information is obtained.

In order to achieve said jump-wise movement of the scanning spot it is possible to simply supply an additional control signal to the drive means 10 of the mirror 8, which control signal obviously should have such a variation that the mirror 8 is rotated through a predetermined angle, which corresponds to a displacement $\lambda$ of the scanning spot. For this purpose the control signal consists of two consecutive signal periods of mutually the same duration and the same predetermined shape, but of opposite polarity.

Although this is not necessary per se, it is of advantage to interrupt the control loop, which is formed by the measuring detector 14, amplifier 15, drive means 10 and mirror 8 for a duration of the additional control signal. In FIG. 1 this is achieved by means of the switch 16. This switch 16 is normally in the position shown, the control signal applied to the input 17 being transferred from the control amplifier 15 to the drive means 10. This switch 16 is controlled by a switching device 23, which in its turn is controlled by a command device 24. This command device 24 receives command signals from a detection circuit 25, to which the signal read from the record is applied, and which for example detects the vertical synchronizing pulses from a read-out television signal. Thus, obviously, the detection circuit 25 contains a standard vertical synch detector such as those used in television receivers. At the desired instants this command device, which may be operated manually, provides start signals for the switching device 23 from said synchronizing pulses. In response to the start signals, the switching device then changes over the switch 16, so that the said control loop is interrupted. Moreover, this switching device 23 then supplies the desired control signal from a signal source to the second input 18 of the switch 16, via which this control signal is then transferred to the drive means 10. After the jump-wise displacement of the scanning spot A has been performed, the switch 16 is then reset to the position shown. Embodiments of the switching device 23 and the command device 24 and possible control signals for this, are comprehensively described in the cited U.S. Pat. No. 3,854,015.

FIG. 3a by way of example shows a squarewave control signal, which consists of a first positive pulse of a duration T and an amplitude $\hat{K}$, followed by a negative pulse of the same duration T and amplitude $\hat{K}$. The total duration 2T of this control signal will for example be 400 $\mu$secs. When it is assumed that at the beginning of this control signal ($t = 0$) the mirror 8 is in the rest position, the speed of rotation of the mirror will exhibit a variation as indicated by V in FIG. 3b, i.e. initially an increasing speed until the instant $t = T$, after which the speed decreases again until at the instant $t = 2T$ the speed is zero again. In FIG. 3c shows the variation of the displacement S of the scanning spot corresponding to said variation of the speed of rotation of the mirror 8.

For a correct choice of the amplitude K and the period 2T of the control signal K, the path-length S covered at the instant 2T will exactly equal the nominal track distance λ, which means that if at the instant $t = 0$ starting took place from the track $Q_1$, the scanning spot A just coincides with the track $Q_2$ at the instant $t = 2T$. The variation of the measuring signal I which occurs during this displacement of the scanning spot A is shown in FIG. 3d (owing to the variable speed V this variation deviates from the variation shown in FIG. 2b).

It will be evident that in this manner only a correct jump-wise displacement of the scanning spot is obtained if the actual track distance equals the nominal value λ, for which the variation of the control signal K has been designed. This track distance, however, is subject to tolerances and so are of course the properties of the mirror drive 10 and the mirror 8. The effect of these tolerances on the displacement of the scanning spot may simply be represented by a choice of the amplitude of the control signal K which deviates from the nominal value K̂. For illustration a control signal K' having too low an amplitude is represented by the dashed line in FIG. 3a. The corresponding speed V' and the displacement S' of the scanning spot are represented by dashed lines in FIGS. 3b and 3c, while the measuring signal I' is shown by the dashed line in FIG. 3d. It can then be seen from FIG. 3c that at the instant $t = 2T$ a positional error Δ S of the scanning spot relative to the track $Q_2$ remains. At said instant $t = 2T$ it is then obvious that there is a measuring signal $I' = \Delta I$ which differs from zero.

Whether the control system after the closure of the control loop will be capable of pulling the scanning spot to this track $Q_2$, depends on this positional error Δ S and the properties, such as bandwidth, of this control system. However, if this positional error is comparatively great, it is not unlikely that the scanning spot does not pull in on said track $Q_2$ but overshoots it to an adjacent track, so that an unpredictable behavior is obtained which may seriously impair the read-out of the record carrier. It has been assumed hereinbefore that no direction-dependent errors occur. This type of errors may be represented by introducing an unequality between the two half-periods of the control signal K. As a result of this, a final speed error Δ V would arise in addition to a final positional error Δ S, so that the risk of the scanning spot not being pulled in on the track $Q_2$ increases.

Therefore, if in the known apparatus a correct jump-wise displacement of the scanning spot must be assured, very stringent requirements would have to be imposed both on the read apparatus with the directing system and on the record carrier, in particular with respect to the track distance.

Figure 4:
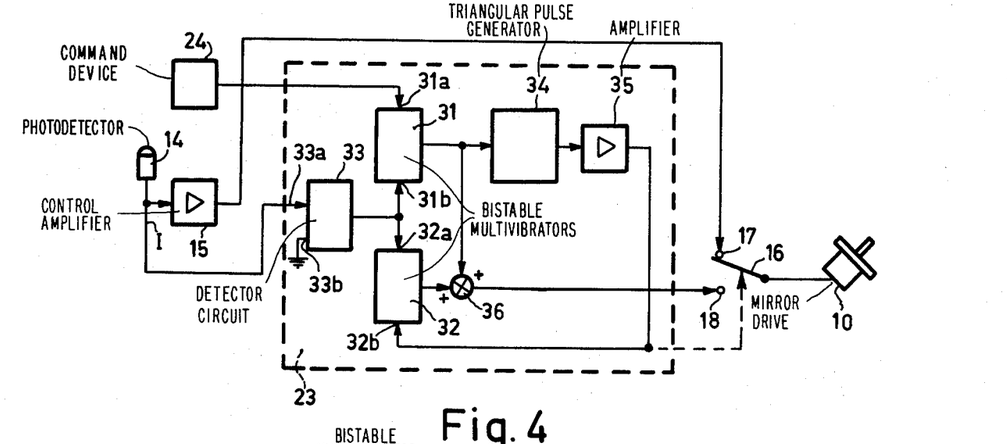
FIG. 4 shows a first embodiment of the switching device used in the read apparatus according to the invention, and FIG. 5, consisting of a through d, shows a number of signals which occur therein during a jump-wise displacement of the scanning spot.
Figure 5:
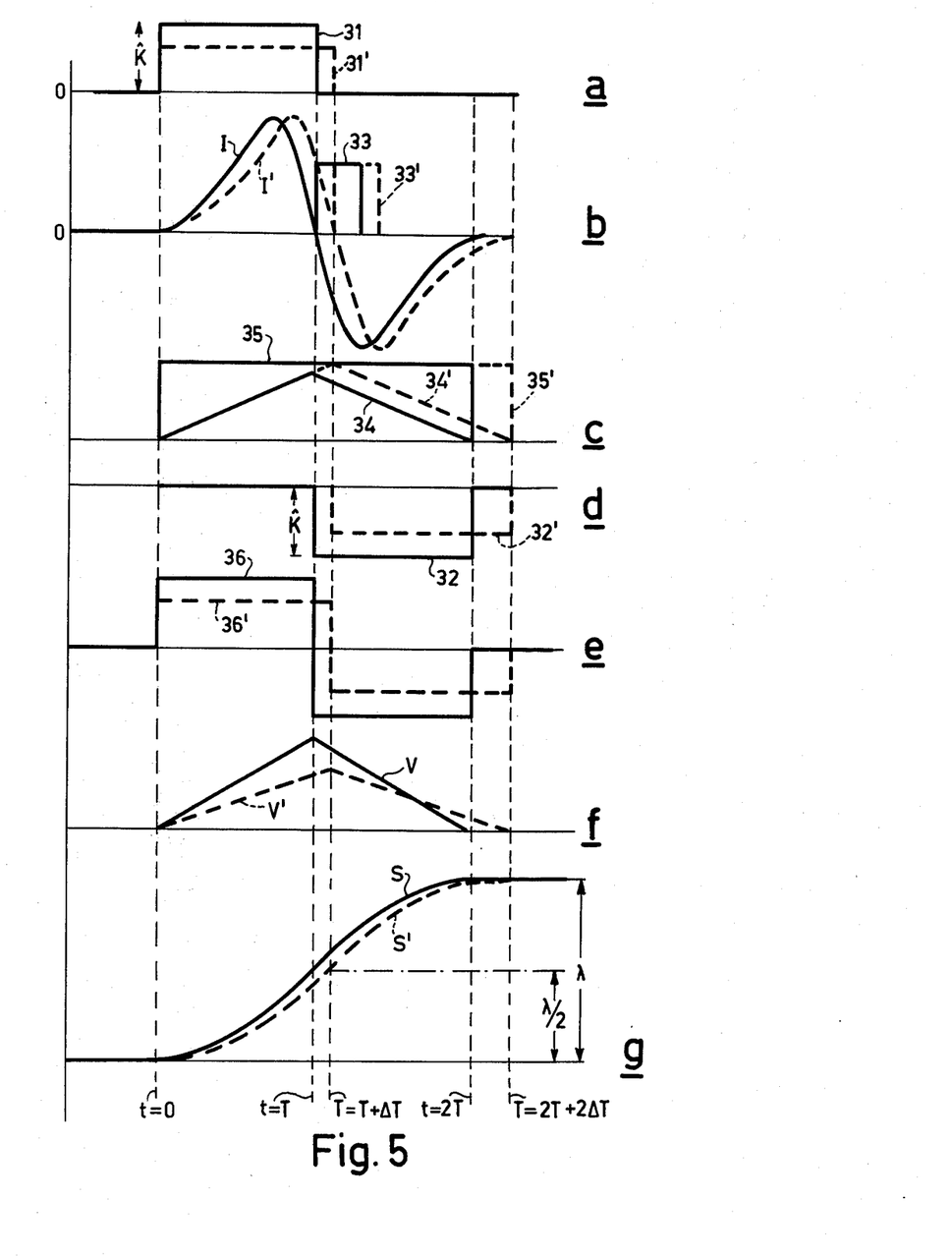

FIG. 4 shows a first embodiment of the switching device as employed in the read apparatus according to the invention, while the signals associated with said switching device are shown in FIG. 5. This switching device 23 first of all comprises a bistable multivibrator 31 with a set input 31a and reset input 31b. The set input 31a is connected to the command device 24. When this set input 31a receives a start signal from this command device 24 at the instant $t = 0$, the output signal of this multivibrator 31 assumes a positive value K̂ (FIG. 5a). This output signal of the multivibrator is then maintained until a reset signal is applied to the reset input 31b. This reset input 31b is connected to a detection circuit 33, which is adapted to detect the instant at which the scanning spot is exactly halfway between two adjacent tracks on the record carrier. For this purpose this detection circuit 33 comprises two inputs, of which the first input 33a is connected to the detector 14 and consequently receives the measuring signal I supplied by the measuring detector 14. The second input 33b of this detection circuit 33 receives a reference signal, in the present instance ground potential.

When it is assumed that the positive signal supplied by the multivibrator 31 is applied to the drive means 10 of the mirror 8, the scanning spot, in a similar ways as in the known apparatus, will experience an accelerated movement in the direction of an adjacent track, which results in a variation of the measuring signal I as shown in FIG. 5b. As soon as this measuring signal I becomes equal to zero at the instant $t = T$, this measuring signal, which is applied to the input 33a, will equal the reference signal applied to the input 33b and this detection circuit 33, which takes the form of a comparator, will produce a pulse-shaped output signal. This output signal is applied to the reset input 31b of the multivibrator 31, so that the output signal of this multivibrator 31 becomes zero again at this instant $t = T$.

This output signal of the detection circuit 33 is also applied to the set input 32a of a second bistable multivibrator 32. It is assumed that this multivibrator 32 supplies a negative output signal of the value K̂ (FIG. 5d) upon the appearance of a set signal at its set input 32a. The reset input 32b of this multivibrator 32 receives a signal from an amplifier 35, which in its turn is driven by a triangular-pulse generator 34. This generator 34 and the amplifier 35 serve to define an instant $t = 2T$, reckoned from the instant $t = 0$. For this purpose, the output signal of the multivibrator 31 is applied to this triangular-pulse generator 34. In the time interval $t = 0$ till $t = T$, during which this output signal of the multivibrator 31 is positive, this generator 34 supplies a linearly increasing signal (FIG. 5c, 34). After the instant $t = T$, at which the output signal of the multivibrator 31 becomes zero again, said triangular-pulse generator supplies a signal which decreases linearly from the value assumed at this instant $t = T$, the slopes of the rising and the falling period of this output signal being equal. This means that this output signal of this triangular-pulse generator becomes zero again at the instant $t = 2T$. By means of the limiting 35 this triangular signal from the triangular-pulse generator 34 is shaped into a square-wave signal (FIG. 5c, 35), which is applied to the reset input 32b of the multivibrator. This multivibrator 32 is reset by the negative-going edge of this output signal of the amplifier 35, i.e. at the instant $t = 2T$.

In an adder circuit 36 the output signals of the two multivibrators 31 and 32 are added to each other, which results in a control signal for the drive means 10 of the mirror 8, which signal is suitable for performing the desired jump-wise displacement of the scanning spot. As previously stated, this control signal may be superimposed on the control signal which is applied to said drive means 10, i.e. without interruption of the control loop. Preferably the control loop is interrupted during this jump-wise displacement of the scanning spot, which again may be effected with the aid of the switch 16, the input 17 of this switch being again directly connected to the amplifier 15 and the input 18 now to the adder circuit 36. The amplifier 35 supplies a suitable control signal for the actuation of this switch, which in FIG. 4 is represented by a dashed line.

Figure 3:
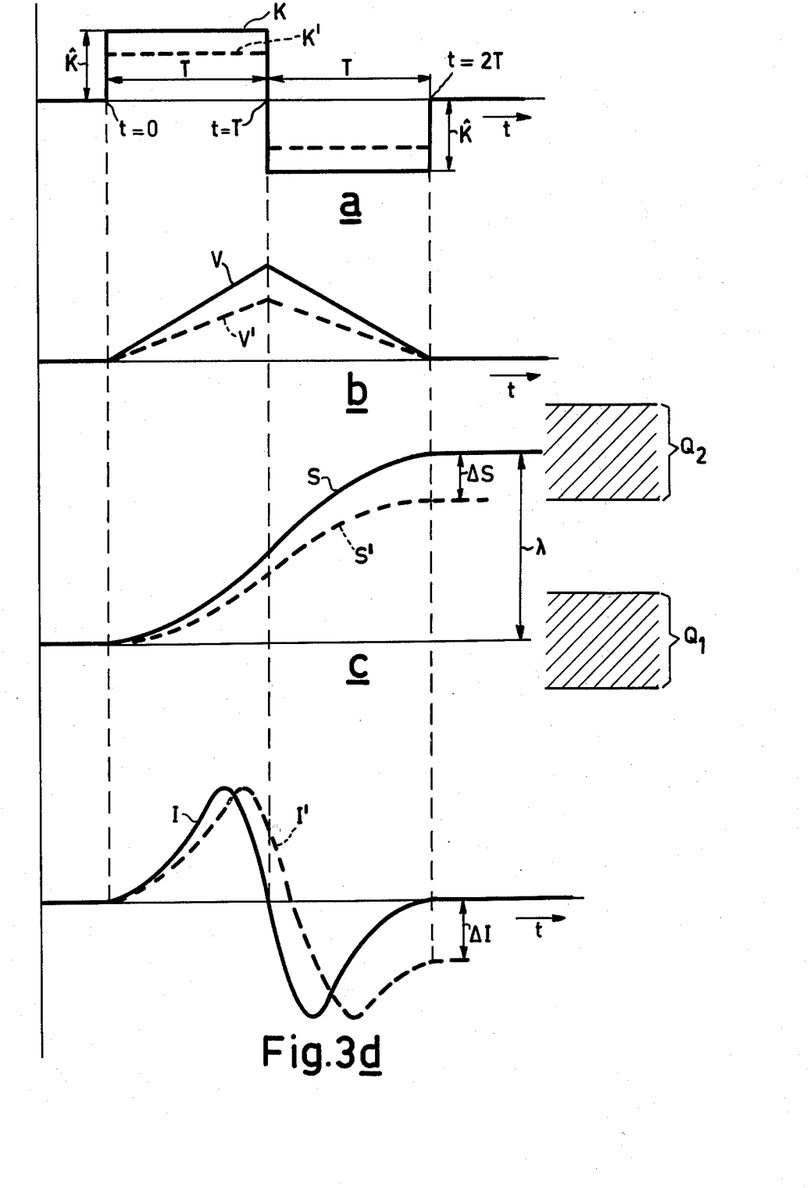

FIGS. 5f and 5g, in a similar way as FIGS. 3b and 3c, show the variation of the speed V and the displacement S of the scanning spot. In order to demonstrate the effect of the step according to the invention, the variations of the various signals are represented in FIG. 5 by dashed lines in the case that the amplitude of the output signals supplied by the multivibrators 31 and 32 is smaller than the nominal value $\check{K}$. As previously stated in the description with reference to FIG. 3, this is in agreement with the assumption that the track distance deviates from the nominal value.

As the control signal which is applied to the drive means 10 of the mirror 8 after the instant $t = 0$ has a smaller value, the speed V' (FIG 5f) will always be smaller than the nominal value V. As a result of this, the variation of the measuring signal I' which is supplied by the amplifier 15 will also deviate from the nominal variation I. The instant at which said measuring signal I' intersects with the zero line will then have shifted towards a greater time value, say $t = T + \Delta T$. This means that the period of the positive pulse supplied by the multivibrator 31 also increases from T to $T + \Delta T$. With the aid of the triangular-pulse generator 34 the period of the negative pulse supplied by the multivibrator 32 is also adapted automatically to said change in duration of the positive pulse, so that the control signal supplied by the adder circuit 36 remains symmetrical. From the Figure it can then be seen that the total duration of the jump-wise displacement has increased from 2T to $2T + 2 \Delta T$. This automatic adaptation of the duration of the control signal ensures that the displacement S at the final instant $t = 2T + 2\Delta T$ of this control signal again equals the nominal value $\lambda$. This is an unambiguous indication that a correct jumpwise displacement of the scanning spot is effected by the switching device according to FIG. 4 irrespective of tolerances in the track distance and the amplitude of the control signal.

It will be evident that with respect to the specific embodiment of the switching device of FIG. 4 many modifications are possible. In a very simple embodiment the triangular-pulse generator 34 may comprise a capacitor and a current source switched by the multivibrator 31, which source during the first signal period of the switching signal charges said capacitor with a constant current and during the second signal period discharges it with the same current. The detection circuit 33 may simply comprise a comparator circuit, which supplies one of two discrete output signals depending on the fact which of the two input signals is greater.

Instead of the triangular-pulse generator 34 it is obvious that alternatively a counting circuit may be employed to determine the duration of the first signal period and thus to define the duration of the second signal period. The count of said counter can then be made to decrease during said second signal period and the multivibrator 32 may be reset upon reaching the zero position. However, it is obvious that alternatively the output signal of this multivibrator 32 may be applied to a second counter, this multivibrator 32 being reset upon equality of the two counters. It is also possible to employ for example a bucket brigade or c.c.d. During the first signal period the pulse supplied by the multivibrator 31 may be read in, subsequently the direction of the information shift may be reversed by the clock signal and the same pulse be read out again.

Figure 6:
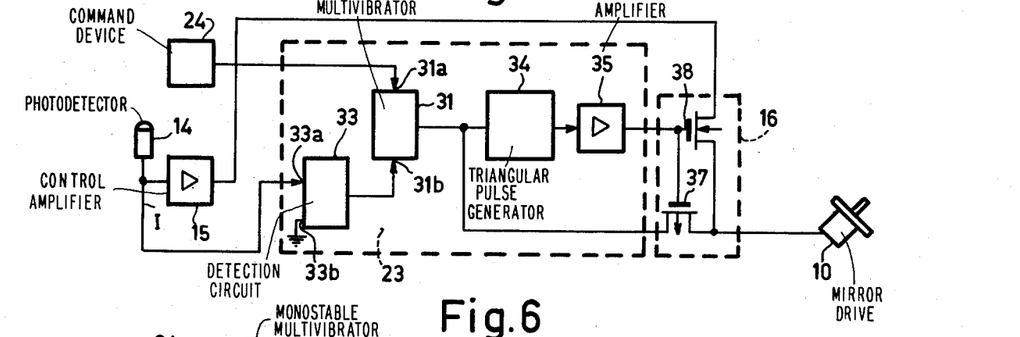
FIG. 6 shows a second embodiment of this switching device, and FIG. 7, consisting of a through c, shows the associated signals, whilst
Figure 7:
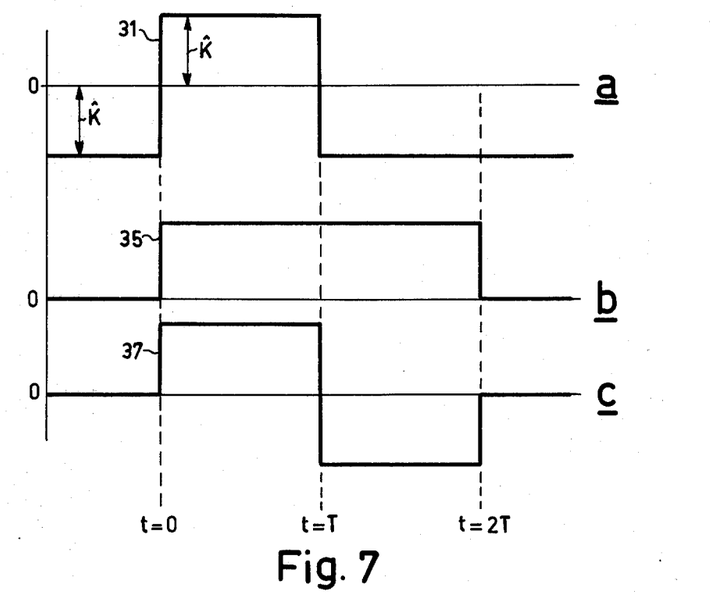

A very simple embodiment of this switching device 23 is shown in FIG. 6 and some associated signal waveforms in FIG. 7, corresponding elements being denoted by the same reference numerals as in FIG. 4. This embodiment of FIG. 6 again comprises the bistable multivibrator 31, whose set input 31a is connected to the command device 24 and whose reset input 31b is connected to the detection circuit 33. This multivibrator 31, however, now always supplies one of two signal values with an amplitude $\check{K}$ which are symmetrically disposed relative to the zero level (FIG. 7a). The output signal of this multivibrator 31 is again applied to a triangular-pulse generator 34 and a limiting amplifier 35, which results in the squarewave signal of FIG. 7b which corresponds to FIG. 6c. This squarewave signal controls the switch 16. In the embodiment shown this switch 16 takes the form of an electronic switch and first of all comprises the field-effect transistor 37. This field-effect transistor 37 is driven by the amplifier 35 and consequently conducts only during the time interval $t = 0$ to $t = 2T$. The main current path of this field-effect transistor 37 constitutes the connection between the output of the multivibrator 31 and the drive means 10, so that eventually the correct control signal, shown in FIG. 7c, for this drive means is obtained. Preferably, the control loop can be interrupted at the same time during said control signal by the insertion of a field-effect transistor 38 in the connection between the amplifier 15 and drive means 10. If said transistor 38 is of a conductivity type opposite to that of transistor 37, the control signal for said transistor may also be taken directly from the amplifier 35.

Figure 8:
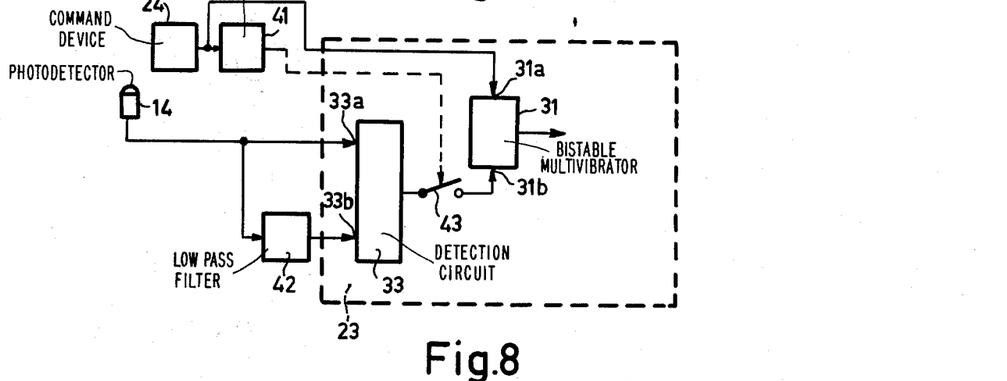
FIGS. 8 and 9 show two further embodiments.

In order to ensure a correct operation of the apparatus according to the invention under all circumstances, a number of additional steps may be taken. Two of these steps are shown in FIG. 8. As can be seen from FIG. 5 the measuring signal I still has a very small value at the beginning of the jump-wise displacement. This means that it is not unlikely that owing to the occurrence of a spurious signal said measuring signal becomes momentarily zero. This would result in an erroneous detection by the detection circuit 33 and thus in an erroneous control signal. In order to prevent this a switch 43 is included in the connection between the detection circuit 33 and the reset input 31b of the multivibrator 31. This switch 43 is for example controlled by a monostable multivibrator 41, which receives the start signal from the command device 24. This arrangement ensures that the switch 43 is not closed until a specific time after the start signal from the command device 24, so that in fact the detection circuit 33 does not become operative until a specific time after said start signal, at which instant the measuring signal I has already assumed a sufficiently great value to avoid erroneous detection as a result of spurious signals.

A second additional step relates to the reference signal which is applied to the second input 33b of the detection circuit 33 which takes the form of a comparator. The measuring signal I supplied by the detector 14 will generally not be zero at the instant that the start signal is supplied by the command device 24. This detector 14 forms part of a control loop with which the radial position of the scanning spot is controlled, for which purpose this detector will always supply a certain error signal. When the speed with which the record carrier rotates is 1500 revolutions/minute, this measuring signal I will contain a 25 Hz component in the case of an eccentricity of this record carrier. This means that for an exact detection of the instant at which the scanning spot is halfway between the two tracks the measuring signal I should not be compared with earth potential, but with a reference signal in which said 25 Hz component is contained. For this purpose, a low-pass filter 42 may be employed, which has a cut-off frequency higher than this 25 Hz, but much lower than the frequency of the control signal. Via this low-pass filter a reference signal derived from the measuring signal I is then applied to the second input 33b of the detection circuit 33. An alternative is to supply the measuring signal to the first input 33a via a frequency-dependent amplifier, said 25 Hz component being highly attenuated. In that case the input 33b may again be at earth potential.

Figure 9:
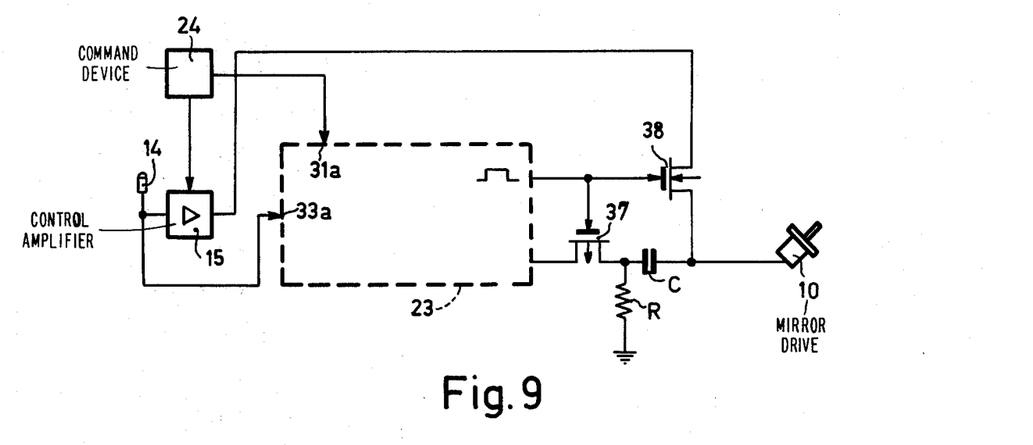

Two further additional steps to ensure a correct jump-wise displacement of the scanning spot are schematically represented in FIG. 9. This Figure first of all shows that the command device 24 also influences the control amplifier 15. It is favorable if during the jump-wise displacement of the scanning spot and preferably also a brief time after that the control loop has a large bandwidth, thus facilitating locking in to the new track. However, during normal tracking a limited bandwidth is preferred in order to prevent an unstable control behavior so that inter alia the initial speed at the starting instant of the jump-wise displacement remains within certain limits. With the aid of the start signal from the command device the bandwidth of the amplifier 15 may then simply be extended during a desired period of time.

Secondly, the connection between the switching transistor 37 and the drive means 10 includes a capacitor C, which is further connected to earth potential via a resistor R. During normal tracking the voltage across this capacitor C will follow the control signal applied to the drive means 10 via the transistor 38. When at the given instant a jump-wise displacement of the scanning spot is desired, the control signal which is applied to this capacitor C via the switching transistor 37 will be super-imposed on the instantaneous voltage across this capacitor C. This means that during the jump-wise displacement of the scanning spot the control signal appearing at the instant of the start signal remains effective.

Finally, it is to be noted that with respect to the specific embodiment of the switching device used in the apparatus according to the invention many modifications are possible. Comparator circuits, multivibrators, triangular-pulse generators and the like are known in many embodiments and may be employed in this switching device. Also with respect to the optical read system which is used it is obvious that this is not limited to the embodiment which is schematically shown in FIG. 1.

What is claimed is:

1. Apparatus for reading a disk-shaped record carrier on which information is recorded in optically coded form in tangentially extending tracks, which apparatus is of the type comprising a radiation source means for producing a read beam of radiation, a directing system means for making a scanning spot produced by said read beam of radiation on the record carrier cooperate with a desired track, a read detector means for converting the information contained in said read beam after cooperation with the record carrier into an electrical signal, a measuring detector means for measuring the radial position of the scanning spot relative to the desired track, and for supplying a corresponding control signal to the directing system, and a switching device means for causing the scanning spot to effect a jump-wise displacement from a track being followed to an adjacent track in response to a start signal, which switching device comprises a signal source means for supplying a control signal which is suitable for causing said jump-wise displacement to the directing system, which control signal consists of two consecutive signal periods of mutually substantially the same duration and substantially the same shape, but of opposite polarity, the improvement wherein the switching device includes a detection circuit means for detecting the instant at which the scanning spot is displaced half-way between two adjacent tracks during the jump-wise displacement and for at that instant supplying a detection signal to the signal source, and wherein said signal source means comprises means for supplying a control signal whose two signal periods have a duration which automatically substantially equals the time interval between the start signal and the detection signal.

2. An apparatus as claimed in claim 1, wherein the detection circuit means includes a comparator with a first input, to which a signal derived from the control signal is applied, and a second input to which a reference signal is applied, said comparator comprising means for supplying the detection signal in the case of equality of the two signals at its two inputs.

3. An apparatus as claimed in claim 2, wherein the reference signal is supplied by a low-pass filter with a cut-off frequency higher than the frequency which corresponds to the speed of the record carrier, to which filter the control signal is applied.

4. An apparatus as recited in claim 2, wherein the detection circuit means includes time delay means for deactivating the response of said detection circuit means to said scanning spot in response to said start signal for a predetermined time interval after said start signal.

5. An apparatus as recited in claim 1, wherein the signal source means of said switching device means comprises a first bistable multivibrator having a set input and a reset input, said set input of said first bistable multivibrator being coupled to receive said start signal, the reset input of said bistable multivibrator being coupled to an output of said detection circuit means, a second bistable multivibrator having a set input and a reset input, said set input of said second bistable multivibrator being coupled to said detection circuit means, a measuring circuit means for determining the duration of a pulse supplied by the first bistable multivibrator and for providing a reset signal to the reset input of the second bistable multivibrator at a time delay after the end of said pulse from the first bistable multivibrator corresponding to said determined duration, and an adding circuit means for adding the pulses supplied by the first and second multivibrator to each other with opposite polarity to form the control signal suitable for causing said jump-wise displacement to the directing system means.

6. An apparatus as claimed in claim 1, wherein the signal source means comprises a bistable multivibrator with a set input which is coupled to said start signal, and a reset input which is coupled to the detection circuit means, a signal generator means controlled by said bistable multivibrator for supplying, during a pulse from said multivibrator, a signal which increases substantially linearly from a limit value and subsequently decreases with the same slope, a pulse shaper means for shaping said signal from the signal generator means into a pulse whose edges correspond to the instants at which said signal from the signal generator means equals the limit value, and a switch included in the connection between the multivibrator and the directing system means and which is controlled by the pulse from the pulse shaper means.

7. Apparatus for reading a disc shaped record carrier on which information is recorded in optically coded form in tangentially extending tracks, said apparatus comprising a radiation source means for producing radiation, directing system means for focussing said radiation as a spot on a desired track, whereby the information in the track modulates the radiation, read detector means for converting the modulated radiation from the track into an electrical signal corresponding to said information, measuring detector means for measuring the radial position of the scanning spot relative to the desired track and for providing a corresponding radial control signal to the directing system means, switching device means responsive to a start signal for replacing the radial control signal with a track-jump control signal of an amplitude sufficient to cause the directing means to move the focussed radiation spot radially off the desired track towards an adjacent track, detection circuit means for detecting the instant that the radiaton spot is disposed halfway between the desired track and the adjacent track and for providing at that instant a detection signal to said switching device means, said switching device means further comprising means responsive to said detection signal for reversing the polarity of said track-jump signal, timing means for measuring the time period between said start signal and said detection signal and for providing a radial control restoring signal to said switching means at a time delayed from said start signal by substantially twice the period of time between said start signal and said detection signal, said switching means operating in response to said radial control restoring signal for substituting the radial control signal for said reverse polarity track-jump control signal.

8. Apparatus as recited in claim 7, further comprising means for storing the instantaneous radial control signal prior to said start signal and for superimposing said stored radial control signal on said track-jump control signal.

* * * * *

UNITED STATES PATENT AND TRADEMARK OFFICE
CERTIFICATE OF CORRECTION

PATENT NO. : 4,057,832
DATED : November 8, 1977
INVENTOR(S) : HERMANUS ANTONIUS KAPPERT It is certified that error appears in the above-identified patent and that said Letters Patent are hereby corrected as shown below:

IN THE TITLE

"CHARGING" SHOULD BE --CHANGING--;

IN THE SPECIFICATION

Col. 1, line 38, "multiplet" should be --multiplex--;

Col. 3, line 31, "a through d" should be --a through g--;

Col. 5, line 58, after "spot" should be --A--;

Col. 8, line 9, "ways" should be --way--;

line 44, after "limiting" should be --amplifier--;

Col. 10, line 31, "5" should be --5b--;

Signed and Sealed this

Ninth Day of May 1978

[SEAL]

Attest:

RUTH C. MASON
Attesting Officer

LUTRELLE F. PARKER
Acting Commissioner of Patents and Trademarks